United States Patent
Ban et al.

(10) Patent No.: US 10,481,299 B2
(45) Date of Patent: Nov. 19, 2019

(54) ANTI-REFLECTIVE COATING COMPRISING NANO-FLAKES FOR REDUCING REFLECTION OF LIGHT, AND TOUCH SUBSTRATE AND DISPLAY APPARATUS HAVING THE SAME

(71) Applicant: BOE TECHNOLOGY GROUP CO., LTD., Beijing (CN)

(72) Inventors: Shengguang Ban, Beijing (CN); Zhanfeng Cao, Beijing (CN); Qi Yao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 172 days.

(21) Appl. No.: 15/744,974

(22) PCT Filed: Mar. 13, 2017

(86) PCT No.: PCT/CN2017/076440
§ 371 (c)(1),
(2) Date: Jan. 15, 2018

(87) PCT Pub. No.: WO2018/165820
PCT Pub. Date: Sep. 20, 2018

(65) Prior Publication Data
US 2019/0011603 A1 Jan. 10, 2019

(51) Int. Cl.
*G02B 27/00* (2006.01)
*G02B 1/118* (2015.01)
*G02B 1/18* (2015.01)

(52) U.S. Cl.
CPC ............... *G02B 1/118* (2013.01); *G02B 1/18* (2015.01)

(58) Field of Classification Search
CPC .......... G02B 1/00; G02B 1/002; G02B 1/005; G02B 1/10; G02B 1/11; G02B 1/111;
(Continued)

(56) References Cited

U.S. PATENT DOCUMENTS 8,587,559 B2 * 11/2013 Gandhi ................... G06F 3/041
178/18.01
8,974,066 B2 * 3/2015 Kalyankar ........... G02B 5/0242
359/229

(Continued)

FOREIGN PATENT DOCUMENTS

| CN | 101200349 A | 6/2008 |
| CN | 102575372 A | 7/2012 |

(Continued)

OTHER PUBLICATIONS

International Search Report & Written Opinion dated Nov. 2, 2017, regarding PCT/CN2017/076440.

*Primary Examiner* — Arnel C Lavarias
(74) *Attorney, Agent, or Firm* — Intellectual Valley Law, P.C.

(57) ABSTRACT

A display apparatus having a substrate and an anti-reflective coating on the substrate. The anti-reflective coating includes a nano-flakes layer having a plurality of nano-flakes for reducing reflection of light on a surface of the substrate; the nano-flakes layer has a first surface distal to the substrate, the first surface having a plurality of nano-pores formed by planes of adjacent nano-flakes; and each of the plurality of nano-pores is configured to reflect at least a portion of incident light multiple times inside the each of the plurality of nano-pores thereby reducing reflection of light on the surface of the substrate.

18 Claims, 5 Drawing Sheets

(58) Field of Classification Search
CPC ......... G02B 1/113; G02B 1/115; G02B 1/116;
G02B 1/118; G02B 5/00; G02B 5/003;
G02B 5/18; G02B 5/1809; G02B
2005/1804; G02B 5/28; G02B 5/285;
G02B 5/286; G02B 5/287; G02B 27/42;
G02B 27/44
USPC ....... 359/577, 580, 581, 585, 586, 588, 589,
359/590, 558, 566, 569, 570, 574, 575,
359/576; 353/20
See application file for complete search history.

(56) References Cited

U.S. PATENT DOCUMENTS

| 9,395,469 | B2* | 7/2016 | Lee ..................... G02B 1/118 |
| 9,423,532 | B2* | 8/2016 | Jewhurst .............. G02B 5/0294 |
| 2012/0196090 | A1 | 8/2012 | Isurugi et al. |
| 2013/0244005 | A1 | 9/2013 | Hsu |

FOREIGN PATENT DOCUMENTS

| CN | 204129718 U | 1/2015 |
| JP | 2010037659 A | 2/2010 |

\* cited by examiner

ANTI-REFLECTIVE COATING COMPRISING NANO-FLAKES FOR REDUCING REFLECTION OF LIGHT, AND TOUCH SUBSTRATE AND DISPLAY APPARATUS HAVING THE SAME

CROSS-REFERENCE TO RELATED APPLICATION

This application is a national stage application under 35 U.S.C. § 371 of International Application No. PCT/CN2017/076440, filed Mar. 13, 2017, the contents of which are incorporated by reference in the entirety.

TECHNICAL FIELD

The present invention relates to display technology, more particularly, to an anti-reflective coating, a touch substrate, a display apparatus, and a method of fabricating an anti-reflective coating.

BACKGROUND

Anti-reflective structures have been found in nature and utilized in various man-made apparatuses. It was discovered that the eyes of night-flying moths have excellent anti-reflective properties. The moth-eye structure is based on the principle of a gradient index of refraction. The tiny features on a moth-eye surface have a continuous refractive index gradient, thereby reducing the light reflection on the moth eye surface. Anti-reflective coatings have been used in various applications, such as the anti-glare coating used on corrective lenses and camera lens.

SUMMARY

In one aspect, the present invention provides a display apparatus, comprising a substrate and an anti-reflective coating on the substrate; wherein the anti-reflective coating comprises a nano-flakes layer comprising a plurality of nano-flakes for reducing reflection of light on a surface of the substrate; the nano-flakes layer has a first surface distal to the substrate, the first surface comprising a plurality of nano-pores formed by planes of adjacent nano-flakes; and each of the plurality of nano-pores is configured to reflect at least a portion of incident light multiple times inside the each of the plurality of nano-pores thereby reducing reflection of light on the surface of the substrate.

Optionally, each of the plurality of nano-pores is configured to reflect the portion of incident light multiple times inside the each of the plurality of nano-pores so that the portion of incident light is substantially absorbed by the anti-reflective coating or transmits through the anti-reflective coating.

Optionally, the display apparatus further comprises a display panel and a touch sensor on the display panel; the anti-reflective coating is on a side of the touch sensor distal to the display panel.

Optionally, an average value of angles between a plane of each of the plurality of nano-flakes and a plane of the surface of the substrate is greater than approximately 45 degrees.

Optionally, an average value of angles between a plane of each of the plurality of nano-flakes and a plane of the surface of the substrate is less than approximately 70 degrees.

Optionally, an average value of angles between the planes of adjacent nano-flakes is in a range of approximately 40 degrees to approximately 90 degrees.

Optionally, planes of the plurality of nano-flakes have one or more configurations selected from the group consisting of a substantially planar configuration, a curved configuration, and a wavy configuration.

Optionally, each of the plurality of nano-flakes has a shape selected from the group consisting of a sheet shape, a plate shape, a belt shape, a ribbon shape, a disc shape.

Optionally, the nano-flakes layer comprises an array of the plurality of nano-flakes along a first direction and a second direction.

Optionally, the plurality of nano-flakes are a plurality of irregularly arranged nano-flakes.

Optionally, the nano-flakes layer comprises a metal oxide.

In another aspect, the present invention provides an anti-reflective coating comprising a nano-flakes layer comprising a plurality of nano-flakes for reducing reflection of light on a surface of the nano-flakes layer; wherein the surface of the nano-flakes layer comprises a plurality of nano-pores forming by planes of adjacent nano-flakes; and each of the plurality of nano pores is configured to reflect at least a portion of incident light multiple times inside the each of the plurality of nano-pores thereby reducing reflection of light on the surface of the anti-reflective coating.

Optionally, each of the plurality of nano-pores is configured to reflect the portion of incident light multiple times inside the each of the plurality of nano-pores so that the portion of incident light is substantially absorbed by the anti-reflective coating or transmits through the anti-reflective coating.

Optionally, an average value of angles between the planes of adjacent nano-flakes is in a range of approximately 40 degrees to approximately 90 degrees.

Optionally, the plurality of nano-flakes are a plurality of irregularly arranged nano-flakes.

Optionally, each of the plurality of nano-flakes has a shape selected from the group consisting of a sheet shape, a plate shape, a belt shape, a ribbon shape, a disc shape.

Optionally, the nano-flakes layer comprises a metal oxide.

In another aspect, the present invention provides a touch substrate, comprising a base substrate; the anti-reflective coating described herein on the base substrate; and a touch electrode layer on a side of the base substrate distal to the anti-reflective coating.

Optionally, an average value of angles between a plane of each of the plurality of nano-flakes and a plane of the surface of the base substrate is greater than approximately 45 degrees.

Optionally, an average value of angles between a plane of each of the plurality of nano-flakes and a plane of the surface of the base substrate is less than approximately 70 degrees.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Figure 1:
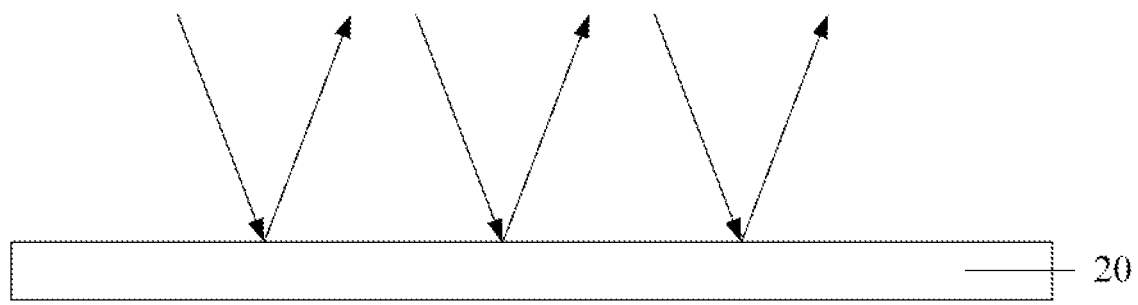
FIG. 1 is a schematic diagram illustrating a light path of an incident light on a surface of a conventional base substrate.

FIG. 1 is a schematic diagram illustrating a light path of an incident light on a surface of a base substrate in a conventional display apparatus. Referring to FIG. 1, when ambient light irradiates on the surface of the base substrate 20, a majority of incident ambient light is reflected by the base substrate 20, and the remaining portion transmits through the base substrate 20 or is absorbed by the base substrate 20.

Thus, in the conventional display apparatus, ambient light reflection occurs at the air-base substrate interface. High levels of ambient light reflection exist particularly in high ambient light conditions, e.g., outdoor environments. The high levels of ambient light reflected back to the viewer degrade contrast of the display. To compensate for the loss of contrast, light intensity of the back light has to be adjusted to higher levels, resulting in a higher power consumption and sometime overheating of the display apparatus.

Accordingly, the present invention provides, inter alia, an anti-reflective coating, a touch substrate, a display apparatus, and a method of fabricating an anti-reflective coating that substantially obviate one or more of the problems due to limitations and disadvantages of the related art. In one aspect, the present disclosure provides a display apparatus having a substrate and an anti-reflective coating on the substrate. The anti-reflective coating includes a nano-flakes layer having a plurality of nano-flakes for reducing reflection of light on a surface of the substrate. Optionally, the nano-flakes layer has a first surface distal to the substrate, the first surface having a plurality of nano-pores formed by planes of adjacent nano-flakes. Optionally, each of the plurality of nano-pores is configured to reflect at least a portion of incident light multiple times inside the each of the plurality of nano-pores thereby reducing reflection of light on the surface of the substrate. Optionally, each of the plurality of nano-pores is configured to reflect the portion of incident light multiple times inside the each of the plurality of nano-pores so that the portion of incident light is substantially absorbed by the anti-reflective coating or transmits through the anti-reflective coating. The present anti-reflective coating can be directly applied to a surface (external surface or internal surface) of the display apparatus or on a protective film of the display apparatus, to reduce ambient light reflections and at the same time increase transmitted light.

Figure 2:
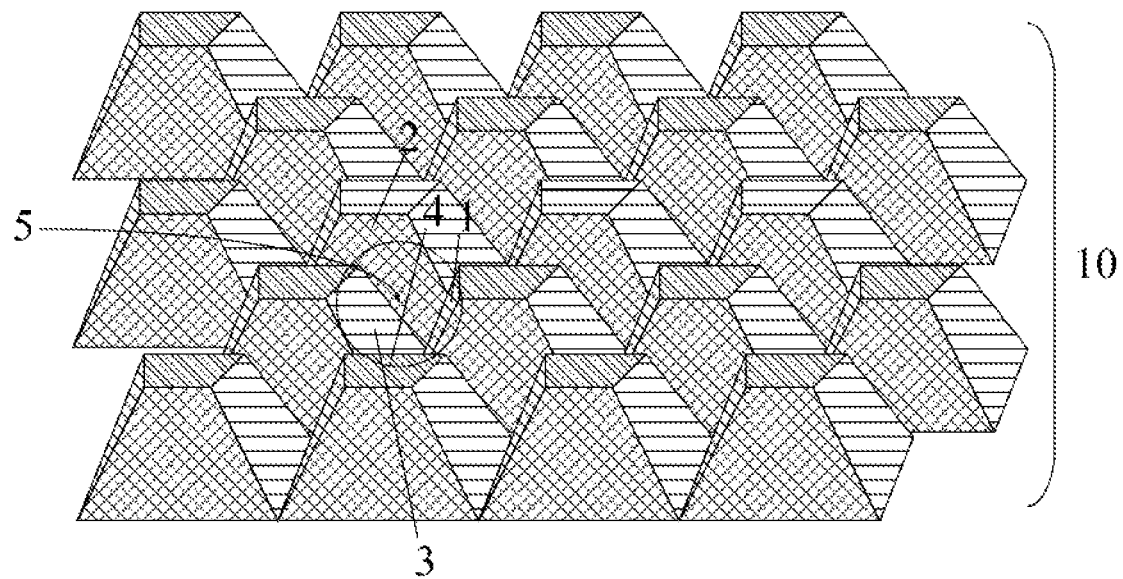
FIG. 2 is a schematic diagram illustrating an anti-reflective coating in some embodiments according to the present disclosure.

FIG. 2 is a schematic diagram illustrating an anti-reflective coating in some embodiments according to the present disclosure. Referring to FIG. 2, the anti-reflective coating in some embodiments includes a nano-flakes layer 10. The nano-flakes layer 10 includes plurality of nano-flakes 1, 2, 3, 4 for reducing reflection of light on a surface of the nano-flakes layer 10. As used herein, the term "nano-flake" refers to particles that are flake-like in shape and have any dimension in the nanometer to micrometer range. For example, the nano-flakes are particles that are relatively thin in one dimension (e.g., z dimension) and have a relatively large area in another two dimensions (e.g., x and y dimensions). Nano-flakes in the nano-flakes layer 10 may be separated from each other. Optionally, some nano-flakes in the nano-flakes layer 10 may be structurally joined together, e.g., stacked against each other. Optionally, the nano-flakes have a thickness in the range of approximately 10 nm to approximately 100 nm, an average width in the range of approximately 100 nm to approximately 10 µm, and an average length in the range of approximately 100 nm to approximately 10 µm. Optionally, the nano-flakes have an aspect ratio (width to thickness or length to thickness) in the range of approximately 2 to approximately 500, e.g., approximately 2 to approximately 50, approximately 50 to approximately 100, or approximately 100 to approximately 500.

As shown in FIG. 2, in some embodiments, the surface of the nano-flakes layer 10 is a corrugated surface configured to trap light in the nano-flakes layer 10. The corrugated surface of the nano-flakes layer 10 in some embodiments is a porous surface having a plurality of nano-pores 5, The nano-pore 5 is formed by planes of adjacent nano-flakes. FIG. 2 shows a nano-pore 5 formed by at least the planes of nano-flakes 1, 2, 3, and 4. The nano-pore 5 is configured to reflect at least a portion of incident light multiple times inside the nano-pore 5 to reduce reflection of light on the surface of the anti-reflective coating.

Figure 3:
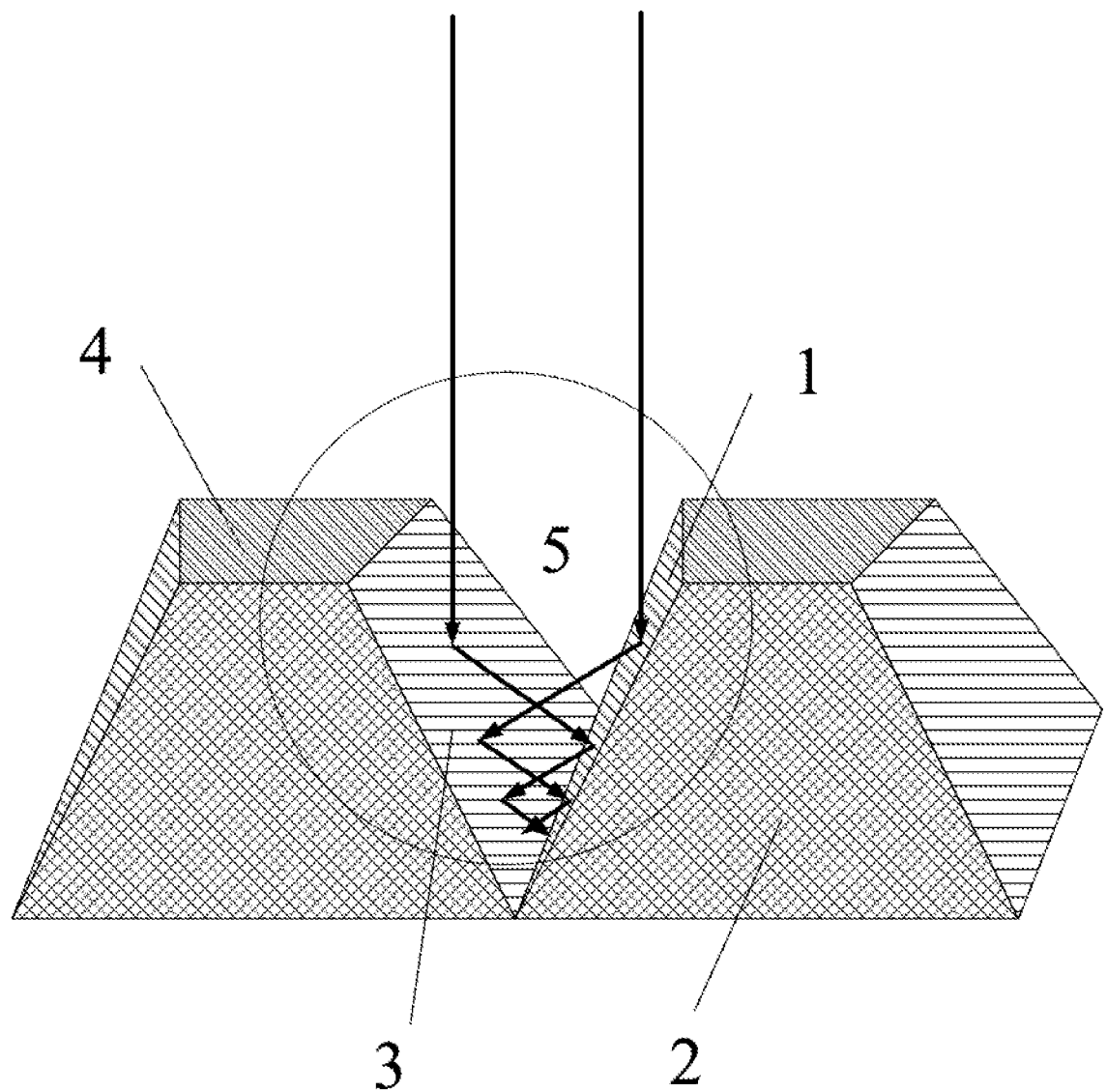
FIG. 3 is a schematic diagram illustrating a light path of an incident light in a nano-pore of an anti-reflective coating in some embodiments according to the present disclosure.

FIG. 3 is a schematic diagram illustrating a light path of an incident light in a nano-pore of an anti-reflective coating in some embodiments according to the present disclosure. Referring to FIG. 3, two incident light beams enter into the nano-pore 5, the first light beam is first reflected by a plane of the nano-flake 3, and the reflected light is then reflected multiple times between the planes of the nano-flake 1 and 3. Similarly, the second light beam is first reflected by a plane of the nano-flake 1, and the reflected light is bounced back and forth between the planes of the nano-flake 1 and 3. The light beams that have been reflected multiple times in the nano-pore 5 are reflected towards the bottom of the nano-pore 5. Light in these light beams is substantially either absorbed by the anti-reflective coating or transmits through the anti-reflective coating. None or very little light is reflected back along a direction opposite to the direction of the incident light.

Figure 4:
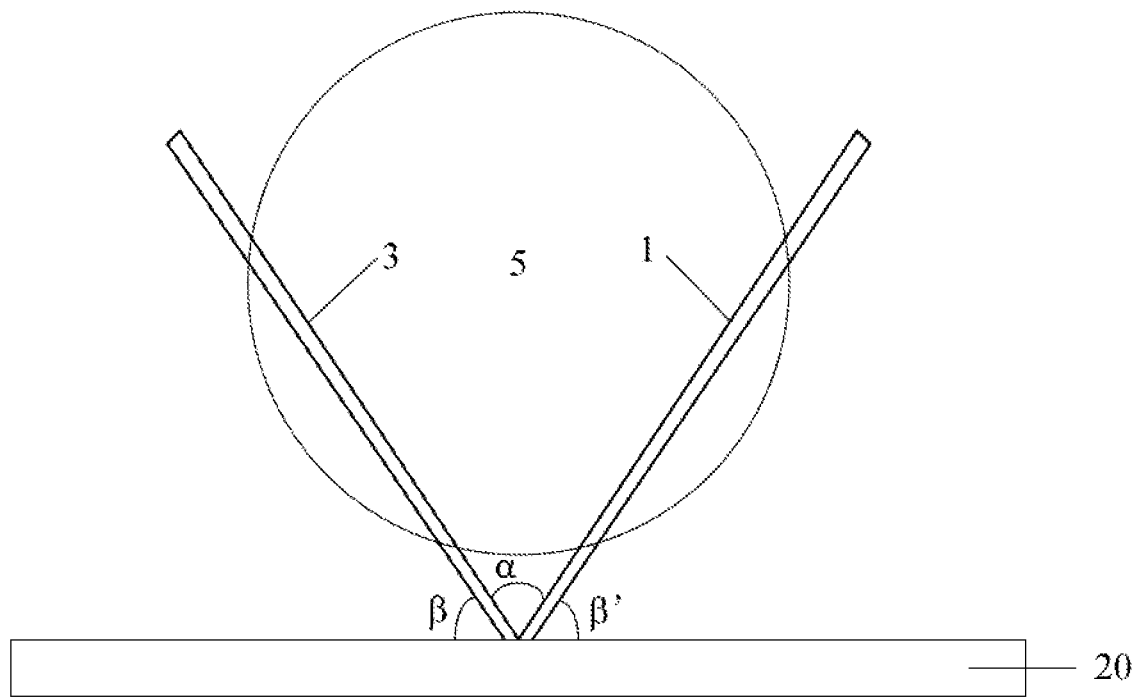
FIG. 4 is a schematic diagram illustrating angles between planes of nano-flakes and between a plane of a nano-flake and a plane of a surface of a substrate in some embodiments according to the present disclosure.

Depending on the angle between the reflecting planes of the nano-flakes and the surface of a base substrate on which the anti-reflective coating is disposed, the amount of light trapped in the nano-pores 5 may vary. FIG. 4 is a schematic diagram illustrating angles between planes of nano-flakes and between a plane of a nano-flakes and a plane of a surface a substrate in some embodiments according to the present disclosure. Referring to FIG. 4, the angle between planes of two adjacent nano-flakes 1 and 3 is denoted as α. The angle between the plane of the nano-flake 3 and the plane of the surface of an underlying base substrate 20 is denoted as β, and the angle between the plane of the nano-flake 1 and the plane of the surface of an underlying base substrate 20 is denoted as β'. In some embodiments, the smaller the angle α, the more incident light may be trapped inside the nano-pore 5. Optionally, the larger the angles β and β', the more incident light may be trapped inside the nano-pore 5.

In some embodiments, the angle between a plane of a nano-flake (e.g., 1 and 3) and a plane of the surface of the base substrate 20 is in the range of 0 degree to 90 degrees. Optionally, an average value of angles between a plane of each of the plurality of nano-flakes and a plane of the surface of the substrate is greater than approximately 45 degrees, e.g., greater than approximately 50 degrees, greater than approximately 60 degrees, greater than approximately 70 degrees, or greater than approximately 80 degrees. Optionally, the average value of angles between the plane of each of the plurality of nano-flakes and the plane of the surface of the substrate is less than approximately 70 degrees, e.g., less than approximately 60 degrees. Optionally, the average value of angles between the plane of each of the plurality of nano-flakes and the plane of the surface of the substrate is in the range of approximately 45 degrees to approximately 70 degrees, e.g., in the range of approximately 55 degrees to approximately 70 degrees.

In some embodiments, the angle between planes of two adjacent nano-flakes (e.g., 1 and 3) is in the range of 0 degree to 180 degrees. Optionally, an average value of angles between the planes of adjacent nano-flakes is greater than approximately 40 degrees, e.g., greater than approximately 50 degrees, greater than approximately 60 degrees, greater than approximately 70 degrees, greater than approximately 80 degrees, or greater than approximately 90 degrees. Optionally, an average value of angles between the planes of adjacent nano-flakes is less than approximately 90 degrees, e.g., less than approximately 80 degrees, less than approximately 70 degrees, less than approximately 60 degrees, or less than approximately 50 degrees. Optionally, the average value of angles between the planes of adjacent nano-flakes is in the range of approximately 40 degrees to approximately 90 degrees, e.g., in the range of approximately 40 degrees to approximately 80 degrees.

Figure 5:
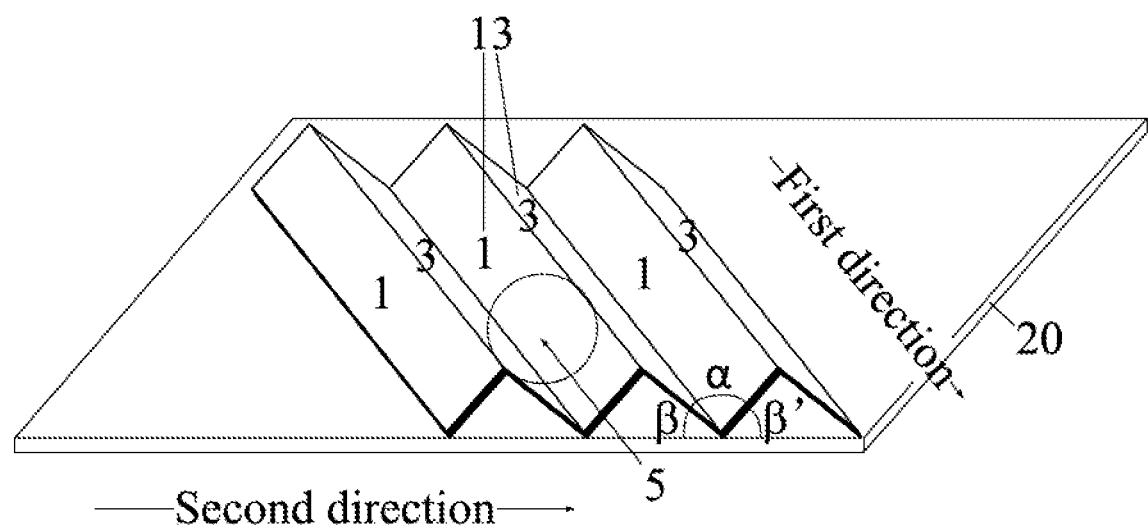
FIG. 5 is a schematic diagram illustrating an anti-reflective coating in some embodiments according to the present disclosure.

The nano-flakes may be arranged in the nano-flakes layer in various appropriate manners. In some embodiments, the nano-flakes layer includes an array of a plurality of nano-flakes along a first direction and a second direction. In one example, the nano-flakes may have an elongated dimension substantially along the first direction, and stack against each other substantially along the second direction. FIG. 5 is a schematic diagram illustrating an anti-reflective coating in some embodiments according to the present disclosure. Referring to FIG. 5, the nano-flakes layer in some embodiments includes a plurality of repeating units 13 arranged along a second direction. Each of the plurality of repeating units 13 includes a plurality of nano-flakes (e.g., a first nano-flake 1 and a second nano-flake 3). Each of the plurality of nano-flakes extends substantially along a first direction. FIG. 5 illustrates a nano-flakes layer having a plurality of repeating units 13, each of which includes a first nano-flake 1 and a second nano-flake 3. An angle between planes of an adjacent pair of a first nano-flake 1 and a second nano-flake 3 is denoted as α. The angle between the plane of the nano-flake 3 and the plane of the surface of an underlying base substrate 20 is denoted as β, and the angle between the plane of the nano-flake 1 and the plane of the surface of an underlying base substrate 20 is denoted as β'.

A plurality of nano-pores 5 are formed on the surface of the nano-flakes layer between adjacent planes of the fast nano-flake 1 and the second nano-flake 3. Each of the plurality of nano-pores 5 is configured to reflect at least a portion of incident light multiple times inside the each of the plurality of nano-pores 5 thereby reducing reflection of light on the surface of the substrate. The nano-flakes may be various appropriate shapes. e.g., a rectangular shape, a square shape, a parallelogram shape, a pentagon shape, a triangular shape, a diamond shape, etc. The nano-flakes in FIG. 5 have a substantially rectangular shape.

Figure 6:
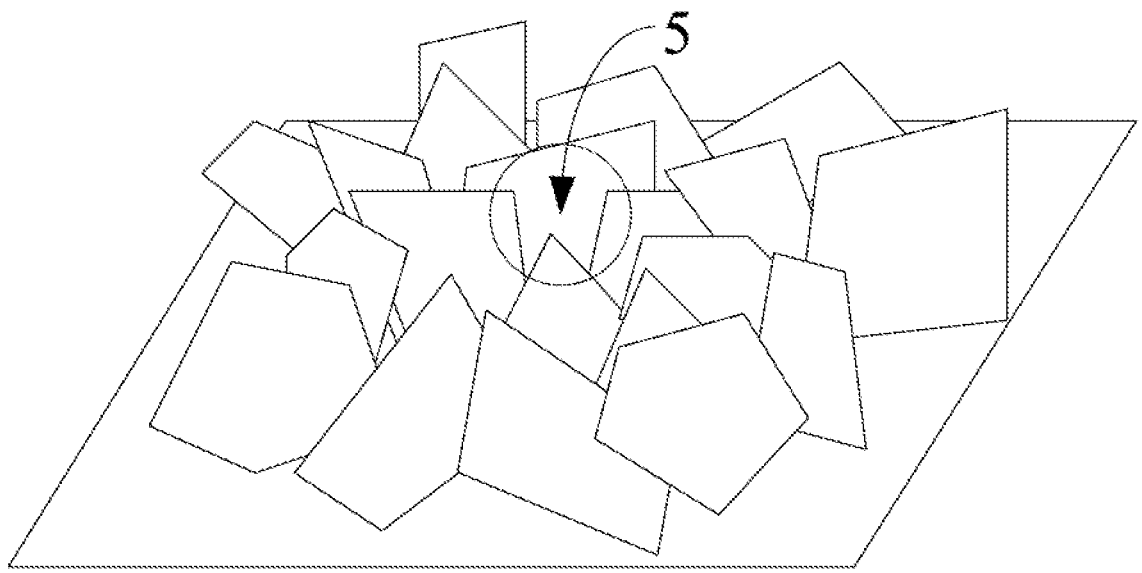
FIG. 6 is a schematic diagram illustrating an anti-reflective coating in some embodiments according to the present disclosure.

FIG. 6 is a schematic diagram illustrating an anti-reflective coating in some embodiments according to the present disclosure. Referring to FIG. 6, the nano-flakes layer in some embodiments includes a plurality of irregularly arranged nano-flakes. The surface of the nano-flakes layer includes a plurality of nano-pores 5 forming by planes of adjacent nano-flakes. The nano-flakes may be various appropriate shapes, e.g., irregular shapes.

In another aspect, the present disclosure provides a method fabricating an anti-reflective coating. In some embodiments, the method includes forming a nano-flakes layer having a plurality of nano-flakes on a surface of a substrate. The nano-flakes layer is formed to have a first surface distal to the substrate, and the first surface has a plurality of nano-pores formed by planes of adjacent nano-flakes. Optionally, each of the plurality of nano-pores is formed to reflect at least a portion of incident light multiple times inside the each of the plurality of nano-pores thereby reducing reflection of light on the surface of the substrate. Optionally, each of the plurality of nano-pores is formed to reflect the portion of incident light multiple times inside the each of the plurality of nano-pores so that the portion of incident light is substantially absorbed by the anti-reflective coating or transmits through the anti-reflective coating.

Various appropriate methods may be used to form the nano-flakes layer. For example, a nano-flakes layer having an array of nano-flakes may be fabricated by a lithography method. Optionally, the nano-flakes layer may be formed by a deposition method, e.g., a chemical bath deposition method, a chemical vapor deposition method, an electron beam evaporation method, etc.

Various appropriate materials may be used to form the nano-flakes layer. For example, an optical transparent material may be deposited on a substrate in a form of nano flakes, using a deposition method, e.g., the chemical bath deposition method, Examples of appropriate materials for forming the nano-flakes include, but are not limited to, metal oxides (indium tin oxide, fluorine doped tin oxide, zinc oxide, aluminum oxide), graphene, non-metal oxides, metal nitrides, metal oxynitrides, metal sulfides, etc. Optionally, the nano-flakes are made of indium tin oxide. Optionally, the nano-flakes are made of fluorine doped tin oxide.

Planes of the nano-flakes may have various appropriate curvatures as long as the nano-pores formed by the planes of the nano-flakes can sufficiently trap incident light. Optionally, the planes of the nano-flakes are substantially planar. Optionally, the planes of the nano-flakes have a non-planar configuration. Optionally, the planes of the nano-flakes are curved planes. Optionally, the planes of the nano-flakes have wavy surfaces. Thus, the term nano-flakes in the present disclosure includes various particles such as nano-sheets, nano-belts, nano-plates, nano-discs, nano-platelets, and nano-ribbons. Optionally, each of the plurality of nano-flakes has a shape selected from the group consisting of a sheet shape, a plate shape, a belt shape, a ribbon shape, a disc shape.

In another aspect, the present disclosure provides a touch substrate having an anti-reflective coating integrated therein. In some embodiments, the touch substrate includes a base substrate and an anti-reflective coating described herein or fabricated by a method described herein. Optionally, the touch substrate further includes one or more touch electrode layers. Optionally, the anti-reflective coating is on a side of the base substrate distal to the one or more touch electrode layers. Optionally, the anti-reflective coating is on a side of the base substrate proximal to the one or more touch electrode layers, and the one or more touch electrode layers are on a side of the anti-reflective coating distal to the base substrate.

In some embodiments, the anti-reflective coating includes a nano-flakes layer having a plurality of nano-flakes for reducing reflection of light on a surface of the base substrate. Optionally, the nano-flakes layer has a first surface distal to the base substrate, the first surface having a plurality of nano-pores formed by planes of adjacent nano-flakes. Optionally, each of the plurality of nano-pores is configured to reflect at least a portion of incident Light multiple times inside the each of the plurality, of nano-pores thereby reducing reflection of light on the surface of the base substrate. Optionally, each of the plurality of nano-pores is configured to reflect the portion of incident light multiple times inside the each of the plurality of nano-pores so that the portion of incident light is substantially absorbed by the anti-reflective coating or transmits through the anti-reflective coating.

Optionally, an average value of angles between a plane of each of the plurality of nano-flakes and a plane of the surface of the base substrate is greater than approximately 45 degrees. Optionally, an average value of angles between a plane of each of the plurality of nano-flakes and a plane of the surface of the base substrate is less than approximately 70 degrees.

Figure 7:
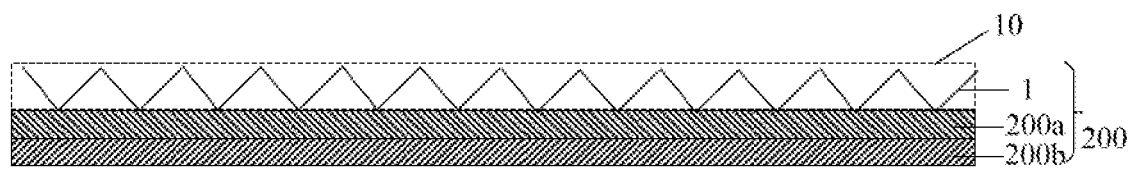
FIG. 7 is a schematic diagram illustrating a touch substrate in some embodiments according to the present disclosure.

FIG. 7 is a schematic diagram illustrating a touch substrate in some embodiments according to the present disclosure. Referring to FIG. 7, the touch substrate 200 in some embodiments includes an anti-reflective coating having a nano-flakes layer 10 to prevent ambient light reflection on a surface of the base substrate 200a. The touch substrate in FIG. 7 includes a base substrate 200a, an anti-reflective coating having a nano-flakes layer 10 on the base substrate 200a, and a touch electrode layer 200b on a side of the base substrate 200a distal to the anti-reflective coating. The nano-flakes layer 10 in FIG. 7 includes a plurality of nano-flakes 1.

Figure 8:
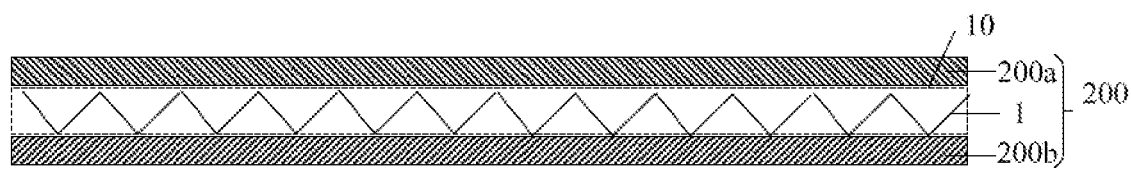
FIG. 8 is a schematic diagram illustrating a touch substrate in some embodiments according to the present disclosure.

FIG. 8 is a schematic diagram illustrating a touch substrate in some embodiments according to the present disclosure. Referring to FIG. 8, the touch substrate 200 in some embodiments includes an anti-reflective coating having a nano-flakes layer 10 to prevent ambient light reflection on a touch electrode layer 200b. The touch substrate in FIG. 8 includes a base substrate 200a, an anti-reflective coating having a nano-flakes layer 10 on the base substrate 200a, and a touch electrode layer 200b on a side of the anti-reflective coating distal to the base substrate 200a. The nano-flakes layer 10 is sandwiched between the base substrate 200a and the touch electrode layer 200b. The nano-flakes layer 10 in FIG. 8 includes a plurality of nano-flakes 1.

In another aspect, the present disclosure provides a display apparatus having a substrate and an anti-reflective coating on the substrate. In some embodiments, the anti-reflective coating includes a nano-flakes layer having a plurality of nano-flakes for reducing reflection of light on a surface of the substrate. Optionally, the nano-flakes layer has a first surface distal to the substrate, the first surface having a plurality of nano-pores formed by planes of adjacent nano-flakes. Optionally, each of the plurality of nano-pores is configured to reflect at least a portion of incident light multiple times inside the each of the plurality of nano-pores thereby reducing reflection of light on the surface of the substrate. Optionally, each of the plurality of nano-pores is configured to reflect the portion of incident light multiple times inside the each of the plurality of nano-pores so that the portion of incident light is substantially absorbed by the anti-reflective coating or transmits through the anti-reflective coating.

Figure 9:
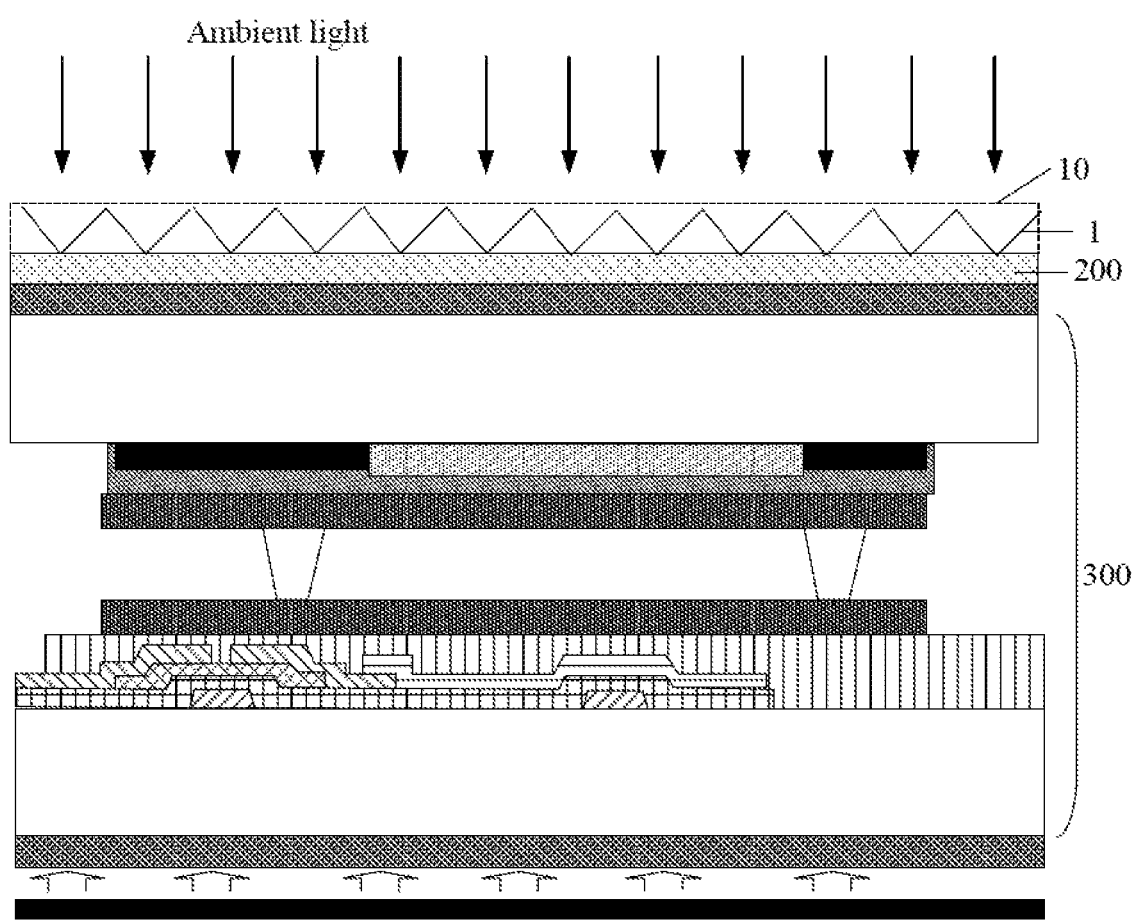
FIG. 9 is a schematic diagram illustrating a display apparatus in some embodiments according to the present disclosure.

FIG. 9 is a schematic diagram illustrating a display apparatus in some embodiments according to the present disclosure. Referring to FIG. 9, the display apparatus in some embodiments includes a display panel 300, a touch substrate 200 disposed on the display panel 300, and an anti-reflective coating having a nano-flakes layer 10 on a side of the touch substrate 200 distal to the display panel 300. The display apparatus shown in FIG. 9 is a liquid crystal display apparatus. The anti-reflective coating of the present disclosure, however, may be applied to any appropriate display apparatuses, including an organic light emitting diode display apparatus. Further, the anti-reflective coating in FIG. 9 is disposed on the light emitting surface of the display apparatus to prevent ambient light reflection on the touch substrate 200. The anti-reflective coating may be disposed on other layers of the display apparatus to prevent ambient light reflection on the other layers. For example, the touch substrate 200 may include a base substrate and a touch electrode layer on the base substrate and on a side of the base substrate proximal to the display panel. In one example, the anti-reflective coating is disposed on a side of the base substrate distal to the touch electrode layer (as shown in FIG. 9). In another example, the anti-reflective coating is disposed on a side of the base substrate proximal to the touch electrode layer to prevent ambient light reflection by the touch electrode layer, e.g., a touch electrode layer made by a metal material. Optionally, the display apparatus includes a plurality of anti-reflective coatings. The nano-flakes layer 10 in FIG. 9 includes a plurality of nano-flakes 1.

Optionally, an average value of angles between a plane of each of the plurality of nano-flakes 1 and a plane of the surface of the touch substrate 200 is greater than approximately 45 degrees. Optionally, an average value of angles between a plane of each of the plurality of nano-flakes 1 and a plane of the surface of the touch substrate 200 is less than approximately 70 degrees. Optionally, an average value of angles between the planes of adjacent nano-flakes 1 is in a range of approximately 40 degrees to approximately 90 degrees.

Examples of appropriate display apparatuses include, but are not limited to, an electronic paper, a mobile phone, a tablet computer, a television, a monitor, a notebook computer, a digital album, a GPS, etc.

The foregoing description of the embodiments of the invention has been presented for purposes of illustration and description. It is not intended to be exhaustive or to limit the invention to, the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display apparatus, comprising a substrate and an anti-reflective coating on the substrate;
   wherein the anti-reflective coating comprises a nano-flakes layer comprising a plurality of nano-flakes for reducing reflection of light on a surface of the substrate;
   the nano-flakes layer has a first surface distal to the substrate, the first surface comprising a plurality of nano-pores formed by planes of adjacent nano-flakes; and
   each of the plurality of nano-pores is configured to reflect at least a portion of incident light multiple times inside the each of the plurality of nano-pores thereby reducing reflection of light on the surface of the substrate;
   wherein an average value of angles between the planes of adjacent nano-flakes is in a range of approximately 40 degrees to approximately 90 degrees.

2. The display apparatus of claim 1, wherein each of the plurality of nano-pores is configured to reflect the portion of incident light multiple times inside the each of the plurality of nano-pores so that the portion of incident light is substantially absorbed by the anti-reflective coating or transmits through the anti-reflective coating.

3. The display apparatus of claim 1, further comprising a display panel and a touch sensor on the display panel;
   the anti-reflective coating is on a side of the touch sensor distal to the display panel.

4. The display apparatus of claim 1, wherein the average value of angles between the plane of each of the plurality of nano-flakes and the plane of the surface of the substrate is greater than approximately 45 degrees.

5. The display apparatus of claim 1, wherein planes of the plurality of nano-flakes have one or more configurations selected from the group consisting of a substantially planar configuration, a curved configuration, and a wavy configuration.

6. The display apparatus of claim 1, wherein each of the plurality of nano-flakes has a shape selected from the group consisting of a sheet shape, a plate shape, a belt shape, a ribbon shape, a disc shape.

7. The display apparatus of claim 1, wherein the nano-flakes layer comprises an array of the plurality of nano-flakes along a first direction and a second direction.

8. The display apparatus of claim 1, wherein the plurality of nano-flakes are a plurality of irregularly arranged nano-flakes.

9. The display apparatus of claim 1, wherein the nano-flakes layer comprises a metal oxide.

10. A display apparatus, comprising a substrate and an anti-reflective coating on the substrate;
    wherein the anti-reflective coating comprises a nano-flakes layer comprising a plurality of nano-flakes for reducing reflection of light on a surface of the substrate;
    the nano-flakes layer has a first surface distal to the substrate, the first surface comprising a plurality of nano-pores formed by planes of adjacent nano-flakes; and
    each of the plurality of nano-pores is configured to reflect at least a portion of incident light multiple times inside the each of the plurality of nano-pores thereby reducing reflection of light on the surface of the substrate;
    wherein an average value of angles between a plane of each of the plurality of nano-flakes and a plane of the surface of the substrate is less than approximately 70 degrees.

11. An anti-reflective coating comprising a nano-flakes layer comprising a plurality of nano-flakes for reducing reflection of light on a surface of the nano-flakes layer;
    wherein the surface of the nano-flakes layer comprises a plurality of nano-pores formed by planes of adjacent nano-flakes; and
    each of the plurality of nano-pores is configured to reflect at least a portion of incident light multiple times inside the each of the plurality of nano-pores thereby reducing reflection of light on the surface of the anti-reflective coating;
    wherein an average value of angles between the planes of adjacent nano-flakes is in a range of approximately 40 degrees to approximately 90 degrees.

12. The anti-reflective coating of claim 11, wherein each of the plurality of nano-pores is configured to reflect the portion of incident light multiple times inside the each of the plurality of nano-pores so that the portion of incident light is substantially absorbed by the anti-reflective coating or transmits through the anti-reflective coating.

13. The anti-reflective coating of claim 11, wherein the plurality of nano-flakes are a plurality of irregularly arranged nano-flakes.

14. The anti-reflective coating of claim 11, wherein each of the plurality of nano-flakes has a shape selected from the group consisting of a sheet shape, a plate shape, a belt shape, a ribbon shape, a disc shape.

15. The anti-reflective coating of claim 11, wherein the nano-flakes layer comprises a metal oxide.

16. A touch substrate, comprising:
    a base substrate;
    the anti-reflective coating of claim 11 on the base substrate; and
    a touch electrode layer on a side of the base substrate distal to the anti-reflective coating.

17. The touch substrate of claim 16, wherein an average value of angles between a plane of each of the plurality of nano-flakes and a plane of a surface of the base substrate is greater than approximately 45 degrees.

18. A touch substrate, comprising:
    a base substrate;
    an anti-reflective coating on the base substrate; and a touch electrode layer on a side of the base substrate distal to the anti-reflective coating;

wherein the anti-reflective coating comprises a nano-flakes layer comprising a plurality of nano-flakes for reducing reflection of light on a surface of the nano-flakes layer;

wherein the surface of the nano-flakes layer comprises a plurality of nano-pores formed by planes of adjacent nano-flakes; and each of the plurality of nano-pores is configured to reflect at least a portion of incident light multiple times inside the each of the plurality of nano-pores thereby reducing reflection of light on the surface of the anti-reflective coating;

wherein an average value of angles between a plane of each of the plurality of nano-flakes and a plane of a surface of the base substrate is less than approximately 70 degrees.

* * * * *